United States Patent [19]

Barbour

[11] Patent Number: 4,975,663

[45] Date of Patent: Dec. 4, 1990

[54] FREQUENCY EQUALIZER

[75] Inventor: Dan E. Barbour, Woodridge, Ill.

[73] Assignee: Rockwell International Corporation, El Segundo, Calif.

[21] Appl. No.: 206,913

[22] Filed: Jun. 10, 1988

Related U.S. Application Data

[63] Continuation of Ser. No. 838,991, Mar. 12, 1986, abandoned, which is a continuation of Ser. No. 542,291, Oct. 14, 1983, abandoned.

[51] Int. Cl.$^5$ .............................................. H04B 3/04
[52] U.S. Cl. .................................. 333/28 R; 330/304
[58] Field of Search ........................... 333/28 R, 28 T; 330/304, 51, 282, 86, 107, 109; 381/102, 103

[56] References Cited

U.S. PATENT DOCUMENTS

| | | | |
|---|---|---|---|
| 3,526,858 | 9/1970 | Heinlein et al. | 330/51 X |
| 3,829,626 | 8/1974 | Irwin et al. | 330/109 X |
| 4,105,945 | 8/1978 | Sano et al. | 330/107 X |
| 4,117,412 | 9/1978 | Holman, II | 330/304 X |
| 4,291,276 | 9/1981 | Ida | 330/107 X |
| 4,354,159 | 10/1982 | Schorr et al. | 330/86 |
| 4,490,692 | 12/1984 | Schorr | 333/28 R |

FOREIGN PATENT DOCUMENTS 0101493  6/1982  Japan ................................ 333/28 R Primary Examiner—Eugene R. LaRoche
Assistant Examiner—Benny T. Lee
Attorney, Agent, or Firm—C. B. Patti; V. L. Sewell; H. F. Hamann

[57] ABSTRACT

This disclosure depicts an equalizer circuit having input and output terminals and a reference terminal for receiving a reference voltage. The equalizer circuit comprises a first operational amplifier which has a positive input operatively connected to the input terminal and which also has a negative input and an output. A first adjustable resistive means has a first terminal operatively connected to the negative input of the first operational amplifier a second terminal operatively connected to the output of the first operational amplifier has a reference connection operatively connected to the reference terminal and has a third terminal. A second operational amplifier has a positive input operatively connected to the third terminal of the first adjustable resistive means, has a negative input and has an output operatively connected to the output terminal. A second adjustable resistive means has a first terminal operatively connected to the negative input of the second operational amplifier and a second terminal operatively connected to the output of the second operational amplifier, and also has a reference connection connected to the reference terminal.

2 Claims, 2 Drawing Sheets

FREQUENCY EQUALIZER

This application is a continuation of application Ser. No. 838,991, filed Mar. 22, 1986, now abandoned, which is a continuation of application Ser. No. 542,291 now abandoned.

BACKGROUND OF THE INVENTION

The present invention relates to equalizer networks. In the telecommunications systems it is often necessary to reduce the amplitude distortion of a transmission channel, so that the loss over the bandwidth of the channel is substantially constant, i.e. within prescribed variation limits. Networks which can be cascaded with a transmission channel to make the loss more or less constant are termed amplitude equalizers.

SUMMARY OF THE INVENTION

The present invention involves an equalizer circuit having input and output terminals and a reference terminal for receiving a reference voltage. The equalizer circuit comprises a first operational amplifier which has a positive input operatively connected to the input terminal and which also has a negative input and an output. A first adjustable resistive means has a first terminal operatively connected to the negative input of the first operational amplifier, has a second terminal operatively connected to the output of the first operational amplifier, has a reference connection operatively connected to the reference terminal and has a third terminal. A second operational amplifier has a positive input operatively connected to the third terminal of the first adjustable resistive means, has a negative input and has an output operatively connected to the output terminal. A second adjustable resistive means has a first terminal operatively connected to the negative input of the second operational amplifier and a second terminal operatively connected to the output of the second operational amplifier and also has a reference connection connected to the reference terminal.

OBJECTS OF THE INVENTION

It is a primary object of the present invention to provide an improved equalizer circuit.

It is another object to provide an equalizer circuit having separate low frequency and slope settings.

It is a further object to provide an equalizer circuit having 1 kHz pivoting.

It is yet another object to provide an equalizer circuit which utilizes a minimum number of components and has a low current drain.

It is also another object to provide an equalizer circuit which is economical to manufacture.

BRIEF DESCRIPTION OF THE DRAWINGS

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

DESCRIPTION OF THE PREFERRED EMBODIMENT

Figure 1:
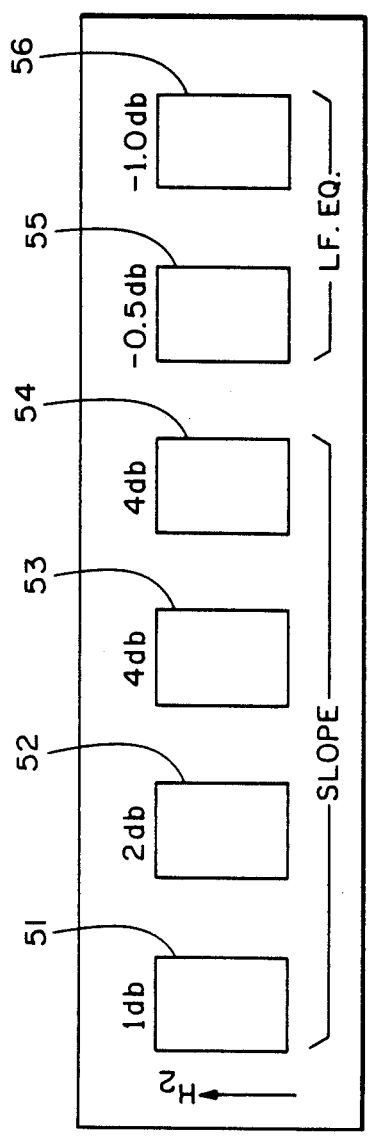
FIG. 1 is a top view of the housing for the novel equalizer circuit showing the switches for adjusting the equalization.

As shown in FIG. 1, the novel equalizer circuit of the present invention utilizes an embodiment having six rocker-type switches S1-S6, four of which, S1-S4, are used to determine the slope and two of which, S5 and S6, determine low frequency equalization. The circuit provides slope equalization for pre or post equalizing loaded and/or nonloaded cables in a four wire configuration. Up to 11 db of slope equalization (1000 to 2800 Hz) is provided and is additive in 1 db increments using switches S1-S4. S3 and S4 are identified as both being 4 db slopes. S4 provides more attenuation at 400 Hz which is required to properly equalize longer lengths of cable. Up to −1.5 db of low frequency equalization (1000 to 400 Hz) is provided and is additive in −0.5 db increments using switches S5 and S6. The equalizer circuit pivots around 1000 Hz which means that the amplitude at 1000 Hz does not change so that no readjustment of gain is required.

The equalizer circuit is set according to Table 1, which appears at the end of the specification, as follows:

(a) Determine that 2800 Hz and 400 Hz losses of the cable with respect to the 1000 Hz loss (loss should be expressed as a positive number, gain as a negative number).

(b) Find a line from Table 1 that best matches the frequency response of the cable facility and set switches as required by that line.

NOTE:

Choose a response from the table such that the 2800 Hz line is less positive than or equal to the facility response and, if possible, the 400 Hz value is more negative than the facility response.

EXAMPLE 1

(1) Nonloaded Cable.
(2) 2800 Hz cable loss equal 13.1 db.
(3) 1000 Hz cable loss equals 5.7 db.
(4) 400 Hz cable loss equals 1.7 db.
(5) 2800 Hz loss with respect to 1000 Hz equals (+13.1 db)−(+5.7 db)= +7.4 db.
(6) 400 Hz loss with respect to 1000 Hz equals (+1.7 db)−(+5.7 db)= −4.0 db.
(7) Choose line with 2800 Hz= +7.2 db, 400 Hz= −4.1 db.
(8) Set switches for 1, 2, 4, −1 ON, 4, −0.5 OFF.

EXAMPLE 2

(1) Loaded Cable
(2) 2800 Hz cable loss equals 10.6 db.
(3) 1000 Hz cable loss equals 10.1 db.
(4) 400 Hz cable loss equals 8.9 db.
(5) 2800 Hz loss with respect to 1000 Hz equals (+10.6 db)−(+10.1 db)= +0.5 db.
(6) 400 Hz loss with respect to 1000 Hz equals (+8.9 db)−(+10.1 db)= +1.2 db.
(7) Choose line with 2800 Hz=0.2 db., 400 Hz= −1.4 db.
(8) Set switches for −1 ON, 1, 2, 4, 4, −0.5 OFF.

NOTE:

When no equalization is required, or a flat frequency response of the receive amplifier is desired, place switches on OFF.

Figure 2:
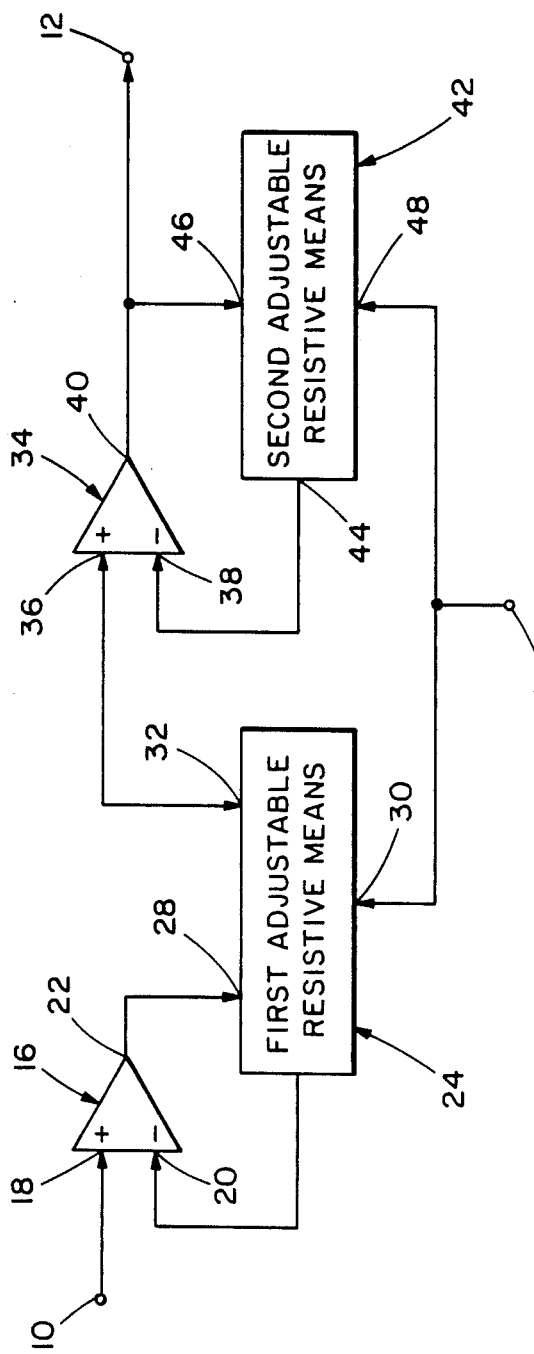
FIG. 2 is a block diagram of the novel circuit.

In general terms, the present invention is an equalizer circuit having input and output terminals 10, 12, and a reference terminal 14 for receiving a reference voltage (see FIG. 2). The equalizer circuit comprises a first operational amplifier 16 which has a positive input 18 operatively connected to the input terminal 10 and which also has a negative input 20 and an output 22. A first adjustable resistive means 24 has a first terminal 26 operatively connected to the negative input 20 of the first operational amplifier 16, has a second terminal 28 operatively connected to the output 22 of the first operational amplifier 16, and has a reference connection 30 operatively connected to the reference terminal 14 and has a third terminal 32. A second operational amplifier 34 has a positive input 36 operatively connected to the third terminal 32 of the first adjustable resistive means 24, has a negative input 38 and has an output 40 operatively connected to the output terminal 12. A second adjustable resistive means 42 has a first terminal 44 operatively connected to the negative input 38 of the second operational amplifier 34 and a second terminal 46 operatively connected to the output 40 of the second operational amplifier 34, and also has a reference connection 48 connected to the reference terminal 14.

Figure 3:
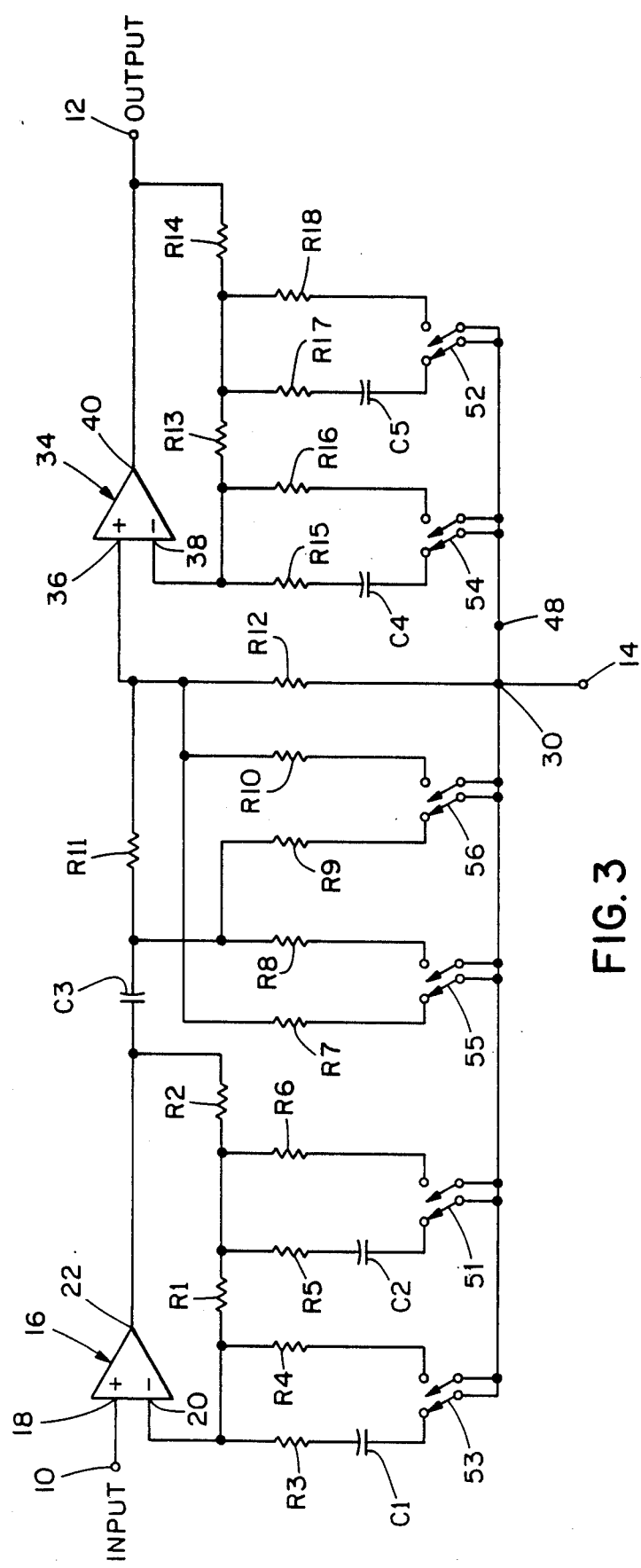
FIG. 3 is a detailed circuit schematic of the FIG. 2 block diagram.

A preferred embodiment of the present invention is shown in FIG. 3. The first adjustable resistive means 16 comprises first and second feedback resistors, R1 and R2, connected between the output 22 and the negative input 20 of the first operational amplifier 16. A first series resistor R5, and capacitor C2 and switch means S1 circuit and a second series resistor R6 and switch means S1 circuit are connected between the juncture of the first and second feedback resistors R1, R2 and the reference connection such that the first and second circuit switch means S1 couples either of the first or second circuits to the reference connection 30. A third series resistor R3, capacitor C1 and a switch means S3 circuit and a fourth series resistor R4 and switch means S3 circuit are connected between the negative input 20 of said first operational amplifier 16 and the reference connection 30 such that the third and fourth circuit switch means S3 couples either the third or fourth circuits to the reference connection 30. A series coupling capacitor C3 and resistor R11 are connected between the output 22 of the first operational amplifier 16 and the positive input 36 of the second operational amplifier 34. A fifth and sixth series resistor and switch means circuits (R10, S6, and R7, S5) are connected between the positive input 36 of the second capacitor 34 and the reference connection 30, and a seventh and eighth series resistor and switch means circuits (R9, S6 and R8, S5) are connected between the juncture of the coupling capacitor and resistor and the reference connection 30.

The fifth and the seventh switch means S6 couples either the fifth or the seventh circuit to the reference connection 30, and the sixth and eighth switch means S5 couples either the sixth or the eighth circuits to the reference terminal 30. A resistor R12 is connected between the positive input 36 of the second operational amplifier 34 and the reference connection 30.

The second adjustable resistive means 42 comprises first and second feedback resistors R13 and R14 connected between the output 40 and the negative input 38 of the operational amplifier 40. A first series resistor, capacitor and switch means circuit (R17, C5, S2) and a second series resistor and switch means circuit (R18, S2) are connected between the juncture of the first and second feedback resistors, R13 and R14, and the reference connection 48 such that the first and second switch means S2 couples either of the first or second circuits to the reference connection 48. A third series resistor, capacitor and switch means circuit (R15, C4, S4) and a fourth series resistor and switch means circuit (R16, S4) are connected between the negative input 38 of the second operational amplifier 34 and the reference terminal 48 such that the third and fourth switch means S4 couples either the third or fourth circuits to the reference connection 48.

Referring to FIG. 3, switches S1, S2, and S3 and S4 are shown in the ON position and switches S5 and S6 are shown in ON position.

In the preferred embodiment, as shown in FIG. 3 where the switches are shown in the IN position, the following circuit values are used:

|  | Ohms |
|---|---|
| R1 | 97.01K |
| R2 | 27.92K |
| R3 | 59.66K |
| R4 | 525K |
| R5 | 92.61K |
| R6 | 315K |
| R7 | 3.5 MEG |
| R8 | 259K |
| R9 | 147.5K |
| R10 | 2.1 MEG |
| R11 | 131.8K |
| R12 | 124.9K |
| R13 | 158.54K |
| R14 | 27.9K |
| R15 | 96.06K |
| R16 | 410K |
| R17 | 38.7K |
| R18 | 245K |
|  | picofarads |
| C1 | 680 |
| C2 | 1000 |
| C3 | 6800 |
| C4 | 680 |
| C5 | 1500 |

The first and second operational amplifier are typical operational amplifer which are well known to one skilled in the art.

The invention is not limited to the particular details of the apparatus depicted and other modifications and applications are contemplated. Certain other changes may be made in the above-described apparatus without departing from the true spirit and scope of the invention herein involved. It is intended, therefore, that the subject matter in the above depiction shall be interpreted as illustrative and not in a limiting sense.

TABLE 1

| Loaded/Nonloaded Cable Equalization | | | | | | | |
|---|---|---|---|---|---|---|---|
| SWITCHES "IN" (X) | | | | | | EQUILIZER GAIN dB* | |
| S1 | S2 | S3 | S4 | S5 | S6 | | |
| 1 | 2 | 3 | 4 | −.5 | −1 | 2800 Hz | 400 Hz |
|  |  |  |  |  |  | 0.0 | −.4 |
|  |  |  | X |  |  | +.2 | −.9 |
|  |  |  |  |  | X | +.2 | −1.4 |
|  |  |  | X |  | X | +.3 | −2.2 |
| X |  |  |  |  |  | +1.0 | −.9 |
| X |  |  | X |  |  | +1.1 | −1.4 |
| X |  |  |  |  | X | +1.2 | −1.9 |
| X |  |  | X |  | X | +1.3 | −2.3 |
|  | X |  |  |  |  | +2.0 | −1.1 |
|  | X |  |  |  |  | +2.1 | −1.6 |
|  | X |  |  |  | X | +2.2 | −2.1 |
|  | X |  | X |  | X | +2.3 | −2.9 |
| X | X |  |  |  |  | +3.0 | −1.7 |
| X | X |  | X |  |  | +3.1 | −2.1 |

TABLE 1-continued

| Loaded/Nonloaded Cable Equalization | | | | | | | |
|---|---|---|---|---|---|---|---|
| SWITCHES "IN" (X) | | | | | | EQUILIZER GAIN dB* | |
| S1 | S2 | S3 | S4 | S5 | S6 | 2800 Hz | 400 Hz |
| 1 | 2 | 3 | 4 | −.5 | −1 | | |
| X | X | | | | X | +3.2 | −2.7 |
| X | X | | | X | X | +3.3 | −3.5 |
| | | X | | | | +4.0 | −1.9 |
| | | X | | X | | +4.1 | −2.3 |
| | | X | | | X | +4.2 | −2.9 |
| | | X | | X | X | +4.3 | −3.6 |
| X | | X | | | | +5.0 | −2.4 |
| X | | X | | X | | +5.1 | −2.9 |
| X | | X | | | X | +5.2 | −3.4 |
| X | | X | | X | X | +5.3 | −4.2 |
| | X | X | | | | +6.0 | −2.5 |
| | X | X | | X | | +6.1 | −3.0 |
| | X | X | | | X | +6.2 | −3.6 |
| | X | X | | | X | +6.3 | −4.4 |
| X | X | X | | X | | +7.1 | −3.6 |
| X | X | X | | | X | +7.2 | −4.1 |
| X | X | X | | X | X | +7.3 | −4.9 |
| | | X | X | | | +8.0 | −4.3 |
| | | X | X | X | | +8.1 | −4.8 |
| | | X | X | | X | +8.2 | −5.2 |
| | | X | X | X | X | +8.3 | −5.8 |
| X | | X | X | | | +9.0 | −4.8 |
| X | | X | X | X | | +9.1 | −5.3 |
| X | | X | X | | X | +9.2 | −5.9 |
| X | | X | X | X | X | +9.3 | −6.6 |
| | X | X | X | | | +10.0 | −5.0 |
| | X | X | X | X | | +10.1 | −5.5 |
| | X | X | X | | X | +10.2 | −6.0 |
| | X | X | X | X | X | +10.3 | −6.8 |
| X | X | X | X | | | +11.0 | −5.6 |
| X | X | X | X | X | | +11.1 | −6.0 |
| X | X | X | X | | X | +11.2 | −6.6 |
| X | X | X | X | X | X | +11.3 | −7.3 |

NOTE: *Referenced to 1000 Hz gain. (1000 Hz gain is OdB for all equalization settings.)
NOTE: When no equalization is required, or a flat frequency response of the receive amplifier is desired place switches off.

What is claimed is:

1. An equalizer circuit having input and output terminals and a reference terminal for receiving a reference voltage, and said equalizer circuit comprising:
   first operational amplifier means having a positive input operatively connected to the input terminal and also having a negative input and an output;
   first adjustable resistive means, operatively connected to said first operational amplifier to provide a feedback loop, said first resistive means having a first terminal connected to said negative input of said first operational amplifier means and having a second terminal connected to said output of said first operational amplifier means and having feedback resistors series connected there between to provide a feedback loop, said first resistive means also having a reference connection operatively connected to the reference terminal, and having a third terminal, said first resistive means further including a first plurality of series connected resistor, capacitor and switch means circuits and a second plurality of series connected resistor and switch means circuits, said first plurality and said second plurality of circuits being connected in parallel between the series connected resistors of said feedback loop of said first operational amplifier and said reference terminal;
   second operational amplifier means having a positive input operatively connected to said third terminal of said first adjustable resistive means, having a negative input, and having an output operatively connected to said output terminal;
   second adjustable resistive means having a first terminal operatively connected to said negative input of said second operational amplifier means and a second terminal operatively connected to said output of said second operational amplifier means, and also having a reference connection connected to the reference terminal, said second adjustable resistive means further including first and second feedback resistors connected in series between said output and said negative input of said second operational amplifier means, said second adjustable resistive means further including a first series resistor, capacitor and switch means circuit and a second series resistor and switch means circuit connected in parallel between the juncture of said first and second feedback resistors and said reference connection such that said first and second switch means couples said first and second circuits, respectively, to said reference terminal;
   a third series resistor, capacitor and switch means circuit and a fourth series resistor and switch means circuit, said third and said fourth circuits being connected in parallel between said negative input of said second operational amplifier means and said reference terminal such that said third and fourth switch means couples said third and fourth circuits, respectively, to said reference terminal;
   a series coupling capacitor and resistor connected in series between said output of said first operational amplifier means and said positive input of said second operational amplifier means defining said third terminal;
   fifth and sixth series resistor and switch means circuits connected between said positive input of said second operational amplifier means and said reference terminal, and seventh and eighth series resistor and switch means circuits connected between the juncture of said coupling capacitor and resistor and said reference terminal, such that said fifth and seventh switch means couples said fifth and said seventh circuit respectively, to said reference terminal, and such that said sixth and eighth switch means couples said sixth and said eighth circuits, respectively, to said reference terminal; and
   a resistor connected between said positive input terminal of said second operational amplifier means and said reference terminal.

2. An equalizer circuit having input and output terminals and a reference terminal for receiving a reference voltage, and said equalizer circuit comprising:
   first operational amplifier means having a positive input operatively connected to the input terminal and also having a negative input and an output;
   first adjustable resistive means, operatively connected to said first operational amplifier to provide a feedback loop, said first resistive means having a first terminal connected to said negative input of said first operational amplifier means and having a second terminal connected to said output of said first operational amplifier means and having feedback resistors series connected there between to provide a feedback loop, said first adjustable resistive means also having a reference connection operatively connected to the reference terminal, and having a third terminal, said first resistive means further including a first plurality of series connected resistor, capacitor and switch means circuits and a second plurality of series connected resistor and switch means circuits, said first plurality and said second plurality of circuits being connected in parallel between the series connected resistors of said feedback loop of said first operational amplifier and said reference terminal;

second operational amplifier means having a positive input operatively connected to said third terminal of said first adjustable resistive means, having a negative input, and having an output operatively connected to said output terminal;

second adjustable resistive means having a first terminal operatively connected to said negative input of said second operational amplifier means and a second terminal operatively connected to said output of said second operational amplifier means, and also having a reference connection connected to the reference terminal, said second adjustable resistive means including first and second feedback resistors connected in series between said output and said negative input of said second operational amplifier means and a first series resistor, capacitor and switch means circuit and a second series resistor and switch means circuit connected in parallel between the juncture of said first and second feedback resistors and said reference connection such that said first and second switch means couples said first and second circuits, respectively, to said reference terminal;

a third series resistor, capacitor and switch means circuit and a fourth series resistor and switch means circuit, said third and said fourth circuits being connected in parallel between said negative input of said second operational amplifier means and said reference terminal such that said third and fourth switch means couples said third and fourth circuits, respectively, to said reference terminal.

* * * * *